CONFERENCE CIRCUIT WITH SELECTIVE CALL SPLITTING

Filed Sept. 3, 1965

INVENTORS A. H. BUDLONG
E. T. D. CALHOUN
L. F. GOELLER, JR.
BY Frederick W. Padden
ATTORNEY United States Patent Office 3,441,678

Patented Apr. 29, 1969

3,441,678

CONFERENCE CIRCUIT WITH SELECTIVE CALL SPLITTING

Albert H. Budlong, Lincroft, Edward T. D. Calhoun, Long Branch, and Leopold F. Goeller, Jr., Holmdel Township, Monmouth County, N.J., assignors to Bell Telephone Laboratories, Incorporated, New York, N.Y., a corporation of New York Filed Sept. 3, 1965, Ser. No. 484,888
Int. Cl. H04m 3/56
U.S. Cl. 179—18 16 Claims

ABSTRACT OF THE DISCLOSURE

A conference circuit, for use in a telephone switching system, comprising a plurality of identical conferee circuits is disclosed. The input terminals of each of the conferee circuits may be connected to any subscriber line or any trunk, by means of the switching system network. The output terminals of each of the circuits are connected to a transformer-amplifier arrangement for coupling the circuits together and each circuit comprises relays which are controlled by the telephone switching system in response to codes dialed by a controlling one of the conferees. Selective operation of the relays of a circuit causes a conferee which is connected to the input terminals thereof to be either connected to or isolated from the conference coupling arrangement.

This invention relates to communication switching systems and particularly to equipment utilized in telephone systems for furnishing a private consultation service during conference calls.

The switching art has progressed in recent years to the extent that a substantial percentage of telephone customers are now able to dial their own conference calls without the assistance of an operator. Such a call is usually established by means of a conference circuit which connects a plurality of conferee stations into a common loop for conference communication.

A deficiency in the prior art conference circuits is that no facilities are available for enabling a conferee temporarily to exclude one or more of the conferees from the conference loop while retaining the conference connections for a private consultation with the remaining conferees. As a result, conferees often are unwilling to attempt a private consultation over the conference connections and usually terminate the conference to make a new call for the desired consultation. Furthermore, after the consultation call has been completed, a conference call is frequently reoriginated to all of the desired conferees. It is apparent that the foregoing procedure for serving customer needs for a private consultation service during a conference call is inefficient, complex and costly.

Accordingly, an object of our invention is to improve consultation service on conference calls.

Another object is to provide facilities for furnishing a consultation service during a conference call without terminating call connections to a conference circuit.

It is another object of our invention to provide economical, simple and efficient facilities for a consultation service during conference calls, and particularly to provide means for insuring the privacy of such a service.

These and other objects are attained in accordance with a specific illustrative embodiment of our invention wherein simple and economical equipment is furnished in a program controlled telephone system for enabling a conference call controller temporarily to exclude one or more of a plurality of conferees from a conference while a private consultation is conducted with the remaining conferees. The equipment includes a conference circuit having a plurality of ports, or appearances, each of which is individually connectable through the system switching network to a conference call originator station or a conferee station and to intercommunication amplifiers common to all of the ports. In accordance with an aspect of our invention, the conference circuit comprises apparatus which is selectively operable for temporarily splitting the connections between any of the ports and the common amplifiers to block conference communication for the associated conferee while the originator and other conferees privately communicate. The splitting apparatus is operated by common control facilities in response to a code dialed by the conference call controller. When the splitting action is effected, the connections from the associated port through the system switching network are held under control of the common control facilities. After the private consultation has been completed, the control facilities are responsive to a control signal from the conference controller station for releasing the splitting apparatus whereby the split connections are reclosed and each excluded conferee resumes conference communication.

An advantage of our invention is that customers are afforded simple, fast and efficient procedures for consultation service during conference calls inasmuch as repeated conference and consultation calls are eliminated. Moreover, the individual conferees obtaining the consultation service perform less work than in prior art arrangements.

A feature of our invention is that switching equipment is responsive to the receipt of instruction signals from a conference call controller for temporarily excluding a conferee station from a conference while a private consultation is conducted with the remaining conferees.

Another feature is the provision of a conference circuit having a plurality of ports each of which is individually connectable through the system switching network to a conference controller or conferee station and intercommunication amplifiers. The circuit also comprises apparatus which is selectively operable for electrically isolating established connections between any of the ports and the amplifiers to block conference communication for the associated conferee during a private consultation of the remaining conferees.

It is another feature of our invention that the isolating apparatus in the conference circuit includes means for splitting established connections between the amplifiers and any one of the ports while maintaining the connections from that port to the associated conferee station and means for insuring the blockage of conference communication for the latter station during a private consultation by short-circuiting the conductors from the split connections toward the amplifiers while inserting an appropriate amplifier termination resistance in series with such conductors.

Another feature is the provision of a conference circuit for a common control telephone system comprising a plurality of ports each being individually connectable through the system switching network to a telephone station, means connectable between each of the ports for coupling conference communication for conferees, and switching means including magnetic latching relays activated by electrical pulse signals received over control leads from common control equipment of the system for selectively establishing connections from each of the ports to the coupling means and for subsequently splitting the established connections for a private consultation service.

It is another feature of our invention that a conference call controller is enabled to dial a code during a conference call for instructing common control equipment automatically to operate apparatus in a plural port conference circuit which splits the connections between conference amplifiers and a predetermned one of the ports to a conferee station for excluding that station from conference communication during a private consultation of the other conferees.

Another feature, related to the immediately previous one is that a conference call controller is enabled to transmit control signals when a private consultation is completed for instructing the common control equipment automatically to reclose the split connections for restoring the excluded conferee station to the conference.

The foregoing objects, advantages and features, as well as others, of the invention will become more apparent from a reading of the following description with reference to the drawing in which.

Figures 1, 2A:
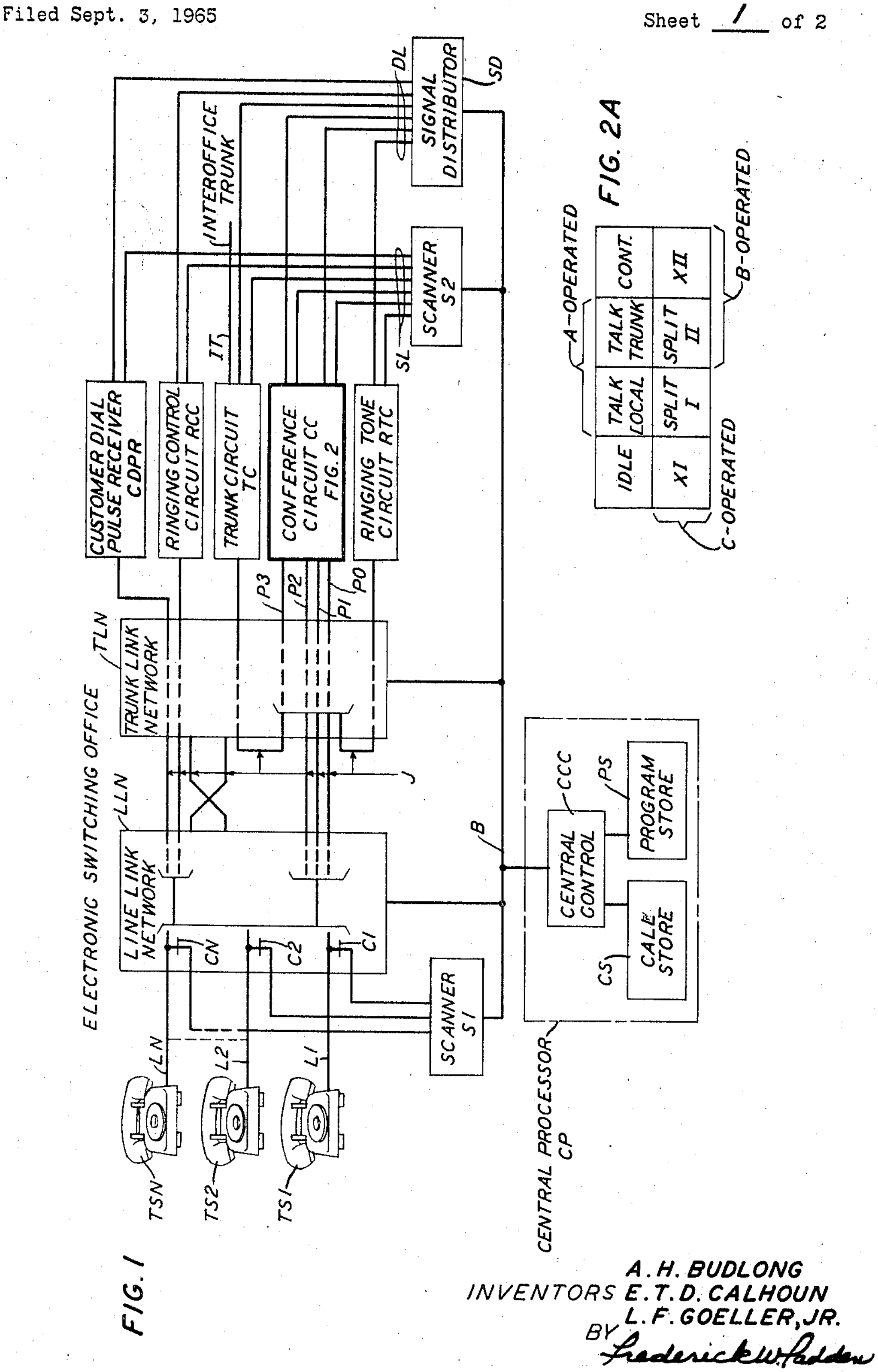
FIG. 1 is a block diagram of an electronic program controlled telephone system employing conference circuitry in accordance with our invention.
FIG. 2A shows a "state" diagram for the various switching states into which the conference circuit of FIG. 2 may be switched during the serving of conference calls providing the consultation service.

Referring to FIG. 1, the principles of our invention are disclosed, by way of example, in an electronic program controlled telephone system of the design disclosed in The Bell System Technical Journal (B.S.T.J.), September 1964, vol. XLIII, No. 5, parts 1 and 2; and in the copending A. H. Doblmaier-R. W. Downing-M. P. Fabisch-J. A. Harr-H. F. May-J. S. Nowak-F. F. Taylor-W. Ulrich patent application, Ser. No. 334,875, filed Dec. 31, 1963. The latter disclosures and the patent applications referred to there in may be consulted for a complete understanding of the construction and operation of the scanners S1 and S2, signal distributor SD, customer dial pulse receiver CDPR, trunk circuit TC, and the central processor CP. Our invention is particularly concerned with the conference circuit depicted by the heavy-lined block in FIG. 1. The other equipment elements are neither shown nor described in detail herein except where necessary for a complete understanding of our invention. While certain of the circuit details of the line and trunk line networks LLN and TLN are set forth in the aforementioned disclosures, more definite specifications or these networks are presented in the following patents: T. N. Lowry 3,231,679 issued Jan. 25, 1966; A. Feiner 3,257,513 issued June 21, 1966; and K. S. Dunlap-A. Feiner-R. W. Ketchledge-H. F. May 3,281,539 issued Oct. 26, 1966. The ringing control circuit and audible ringing tone circuit are disclosed in the L. F. Goeller, Jr. Patent 3,378,650 issued Apr. 16, 1968.

The electronic switching system of FIG. 1 is designed to serve a plurality of telephone stations, such as stations TS1–TSN. Each such station is individually connected to the switching office over one of the telephone lines L–LN and is terminated in both a line link network LLN and a line scanner S1. Network LLN comprises switching facilities for establishing communication connections from station lines L1–LN to the trunk link network TLN via wire junctors J. The network TLN also includes switching facilities for establishing connections from the junctors J to customer dial pulse receivers, such as receiver CDPR; ringing control circuit RCC; audibile ringing tone circuit RTC; conference circuits, such as circuit CC; and other functional circuits such as trunk circuit TC.

Scanner S1 is utilized for sampling, or scanning, the lines L1–LN for telephone receiver "off-hook" and "on-hook" signals. The scanner S2 scans the scan leads SL associated with the dial pulse receiver CDPR, trunk circuit TC, ringing circuits RCC and RTC, and the conference circuit CC for sensing "off-hook" and "on-hook" signals and other supervisory data concerning the associated telephone. The scanning operations are performed at various times in response to program instructions from the central processor CP.

In accordance with the exemplary embodiment of our invention, each conference circuit, for example circuit CC, is equipped with four ports, P0–P3, which are terminated in the trunk link network TLN and are connectable to the telephone stations TS1–TSN and interoffice trunk circuits, such as circuit TC, under control of a signal distributor SD and processor CP.

A substantial amount of the logic, control, memory, supervision and translation functions involved in establishing connections from station lines and interoffice trunks, such as trunk IT, through the networks LN and TLN to functional circuits, such as receiver CDPR and conference circuit CC, and for the operation of the various circuits is performed by the common control equipment comprising the central processor CP. Accordingly, a minimal amount of control circuit is needed in the individual receivers, conference, ringing and trunk circuits and only the essential switching devices and transmission apparatus are included therein. The switching devices, in most instances, comprise magnetic latching relays (for example, relays A0, B0 and C0 in the conference circuit CC of FIG. 2) which are connected to a signal distributor SD over the distributor leads DL. As disclosed in the cited XLIII B.S.T.J., part 2, beginning at p. 2270, this distributor SD acts as a buffer between the high speed central processor CP and the relatively slow speed latching relays to provide for the operation of the relays whereby the circuits are switched into the different states utilized for serving calls. Distributor SD causes the operation and the subsequent release of the latching relays upon the receipt of program instructions from the processor CP.

Communications between the distributor SD, scanners S1 and S2, and processor CP are by way of bus systems which provide discrete communication paths between selected ones of the circuits. These systems are described in the XLIII B.S.T.J., part 1, pp. 2021 to 2054 and are represented herein by the bus B.

As set forth in the cited B.S.T.J. beginning at p. 1845 and in Doblmaier et al., the processor CP is a centralized data processing facility which is employed to implement the various telephone administrative functions of the system. It is functionally divided into three units comprising a call store CS, program store PS and central control circuitry CCC. The call store CS is a temporary, or erasable, memory facility which employs apparatus for storing information pertaining to calls in progress. Such information includes: (1) the busy-idle status of communication paths through networks LLN and TLN; (2) the dialed digits received by a customer dial pulse receiver CDPR; (3) the busy-idle status of a conference circuit CC; and (4) other data pertaining to the telephone stations connected to the ports P0–P3.

The program store PS is a semipermanent memory facility which is employed to store the less changing system information including the system programs and a variety of translation information. Facilities are also furnished in the program store PS for deriving semipermanent information used for routing, charging and ringing on telephone calls.

The central control CCC is the primary information processing unit of the system. It is capable of executing one at a time many different types of basic instructions, or orders, utilized for controlling the line and trunk link networks, dial pulse receivers, scanners, conference circuits, as well as, trunk and ringing circuits during telephone calls. These instructions are written in the form of programs which are stored in the program store PS. The program instructions are the vocabulary of the system and are used to inform the switching circuits of the system how and when to perform their functions. The central control CCC requests an instruction from the program store every few microseconds and, upon receiving it, executes, or commands, the appropriate circuit to carry out the appropriate functions. Accordingly, the central control CCC is the hub of the system which originates all addresses and commands to other circuits and receives back all answers from those circuits. It is important to note, however, that the central control CCC is capable only of executing individual instructions and that the mechanized intelligence needed for the complex switching functions of the system resides in the stored programs.

The principles and organization of the stored program facilities of the illustrative switching system are disclosed in the cited B.S.T.J. beginning at p. 1923. The specific programming of work operations for the illustrative equipment of our invention is not explained in detail herein inasmuch as such programming is at the discretion of the system programmer and his decisions are based upon a number of factors including the size and traffic requirements of the particular telephone office.

In accordance with the illustrative embodiment of our invention, facilities are provided for enabling each telephone station entitled to conference service to originate conference connections among four telephone stations including that of the conference originator. Conference circuit CC is equipped with four ports P0–P3 for this purpose. While the exemplary embodiment discloses a conference service controlled by customary telephone stations, it is to be understood that our invention is also suitable for enabling an operator switchboard or position facilitiy to control the service. For example, any of the telephone stations TS1–TSN could be replaced by operator position facilities for this service. Turning now to the manner in which a conference call is served by the system, it is assumed that such a call is initiated from station TS1. When a customer at that station removes the telephone from its switchhook, an "off-hook" signal is sensed by scanner S1 and the processor CP during a scanning operation detects a request for service. As set forth in Doblmaier et al., processor CP then connects an idle dial pulse receiver CDPR to the calling line via networks TLN and LLN and next instructs distributor SD to activate receiver CDPR over one of the leads DL for returning dial tone to station TS1. The caller then dials a code comprising, for example, special service access digits 11 plus conference service digits 94. This code is detected by the receiver CDPR and is repeated to scanner S2 over one of the scan leads SL. Processor CP subsequently detects this code during a scanning operation and utilizes it for reserving an available conference circuit CC to serve the call.

If such a circuit CC is unavailable or no idle path exists through networks LLN or TLN to any port of an available conference circuit, receiver CDPR is released and the calling station TS1 is connected through networks LLN and TLN to a service circuit (not shown) which sends an overflow tone to the caller. The call must then be abandoned and a new call originated. On the other hand, when a conference circuit CC is available, processor CP reserves that circiut and in response to program instructions notifies distributor SD to activate receiver CDPR for returning a second dial tone interrupted at prescribed intervals as a signal to the conference originator to proceed with the dialing.

After receiving the second dial tone, the caller dials an ADD digit, for example a digit 2, followed by the abbreviated code or directory number of the first conferee. The dialed information is transmitted over the established connections into receiver CDPR which then repeats them to scanner S2 over one of the leads SL. Processor CP detects the repeated information during a scanning operation and utilizes it to reserve an idle path from station TS2 through networks LLN and TLN to an idle port, for example port P1, for subsequent conference communication. Thereafter, processor CP controls the establishment of connections via networks LLN and TLN between the first conferee station, for example station TS2, and a ringing control circuit RCC, as well as between station TS1 and a conference port, for example port P0. In addition, processor CP controls the connection of audible ringing tone circuit RTC through network TLN to an idle conference port, for example port P1. Processor CP next instructs the distributor SD to switch the conference circuit apparatus associated with ports P0 and P1 from IDLE states to so-called TALK LOCAL and TALK TRUNK states, respectively for subsequently sending audible ringing tone to station TS1. At approximately the same time, distributor SD is instructed to switch ringing circuits RCC and RTC from idle states through test states to ringing current and tone states respectively whereby the telephone ringer at station TS2 is energized and audible tone is sent via conference circuit CC to station TS1.

Processor CP monitors for a called party answer signal at station TS2 via scanner S2 and circuit RCC. Upon detecting such a signal, processor CP instructs distributor SD to switch port P1 to its IDLE state and controls the release of circuits RCC and RTC. It also controls the changing of the network path of station TS2 from circuit RCC to an idle port, for example port P1 via the aforementioned reserved path. Next, processor CP and distributor SD cooperate to switch port P1 from its IDLE state to its TALK LOCAL state for enabling conference communication between the conference originator and the first conferee.

A conference originator adds a second and third conferee station to the remaining two conference ports in essentially the same manner as follows. First, a telephone switchhook flash of a prescribed duration is sent from station TS1 via networks LLN and TLN and conference circuit CC to scanner S2 via a scan lead SL. Processor CP then, under program control, immtdeiately switches the port P0 into its so-called SPLIT I state to provide impedance terminations to the conference amplifiers and the line L1. The processor also monitors the flash signal to distinguish it from a calling party disconnect and a lightning hit on the line. Upon detecting a valid conference flash, processor CP maintains the conference port connections through networks LLN and TLN toward each associated conferee line and reserves the corresponding connection to station TS1. Processor CP next instructs distributor SD to switch port P0 to its IDLE state to avoid interrupting currents through ferreed contacts of the networks LLN and TLN. The processor then controls the establishment of connections from line L1 through networks LLN and TLN to an idle receiver CDPR.

If no such receiver is available, processor CP has facilities for establishing a queue memory for a prescribed period in its call store CS concerning the need for a receiver. At the end of this period, if the conference originator is yet awaiting a receiver, line L1 is reconnected over the reserved connections through networks LLN and TLN to conference port P0. Subsequently, the conference originator may again flash in an endeavor to add the desired conferee.

When such a receiver CDPR is connected to line L1 in response to a flash, dial tone is transmitted to that line under control of processor CP and distributor SD. The originator then dials the ADD digit 2 followed by the abbreviated code or directory number of the desired conferee station. Receiver CDPR repeats the dialed digits via scanner S2 to processor CP for enabling it to connect the desired conferee and conference originator stations to the ringing facilities and idle conference ports via networks LLN and TLN as previously explained with respect to station TS2. It is desirable to note at this juncture that if the desired conferee is located at a distant office, the system outpulses sufficient data over the outgoing trunk circuit TC and trunk IT for enabling that office to complete call connections and to ring the conferee station. In the latter situation, the ringing circuits RCC and RTC are not utilized for ringing. Instead, the trunk circuit TC is connected via network TLN to an idle port, for example port P2 or P3 for returning a tone from the distant office to station TS1 at the appropriate time to indicate the ringing of the conferee station.

Processor CP detects when the conferee station answers by monitoring, in cooperation with scanner S2, the ringing control circuit RCC in the case of a local conferee station and trunk circuit TC for a distant office conferee station, via scanner S2. After detecting the answer condition, processor CP controls the release of each associated ringing circuit and changes the network connections for connecting the desired conferee line to an idle circuit port, for example port P2 or P3. Distributor SD and processor CP then cooperate to switch that port from its IDLE state to its TALK LOCAL state if the desired conferee station is a local station or from its IDLE state through a continuity test state to its TALK TRUNK state if the connections to the desired conferee line are completed via trunk TC. Conference communication may thereafter be conducted among all conferees including the conference originator.

While the conference is in progress, any of the conferees may disconnect and cause processor CP to cooperate with distributor SD for returning the associated conference port to its IDLE state. Thereafter, processor CP effects the release of connections from that conferee line through networks LLN and TLN. When the conference originator disconnects, the conference may continue, after the call connections to the originator station and the associated port apparatus have been released provided that the conferees do not disconnect. In such a situation, processor CP enables a predetermined one of the remaining conferees to assume control over the conference connections.

In accordance with our invention, facilities are provided in the system whereby a conference controller either the conference originator or a conferee assuming control after the originator disconnects) is enabled to obtain a private consultation service for predetermined conferees by temporarily excluding a prescribed conferee from conference communication. This service is furnished when a conference controller transmits a telephone switchhook flash after a plurality of conferee lines are connected to the conference ports and then, after the conference port is selectively switched to its split and idle states and dial tone is received from a receiver CDPR as already described, the controller dials a prescribed code. This code is received by receiver CDPR and repeated to scanner S2 over one of the leads SL and is detected by processor CP during a scanning operation. It informs processor CP to switch a prescribed one of the ports currently associated with a selected conferee station from its TALK LOCAL or TRUNK state to its SPLIT I or II state, respectivley. The latter station remains connected to the conference port via the link network until after the consultation service has been completed or the associated customer disconnects. To complete the connections for the consultation service, processor CP disconnects the conference controller station from receiver CDPR and reconnects it over reserved connections of the link network to the associated idle port. Next, processor CP cooperates with distributor SD to switch the latter port to its talk state and the private consultation is effective. Other conferee stations may thereafter be temporarily excluded from communications over the established connections by repeating the foregoing actions but with a different code.

When the consultation service has been completed, the conference controller flashes the telephone switchhook which causes processor CP to control the selective switching of the associated port to its split and idle states and the connection of a receiver CDPR to the controller station via networks TLN and LLN thereby to return dial tone. The controller then dials a code into receiver CDPR which repeats it to scanner S2 and enables processor CP to detect the code during scanning operations. The code causes processor CP to instruct distributor SD to switch each split port from the SPLIT I or II state to the TALK LOCAL or TRUNK state, respectively. Afterwards, processor CP effects the release of receiver CDPR and changes the network connections of the controller station from receiver CDPR to the reserved idle conference port. Processor CP next instructs distributor SD to switch the latter port to its talk state.

Figure 2:
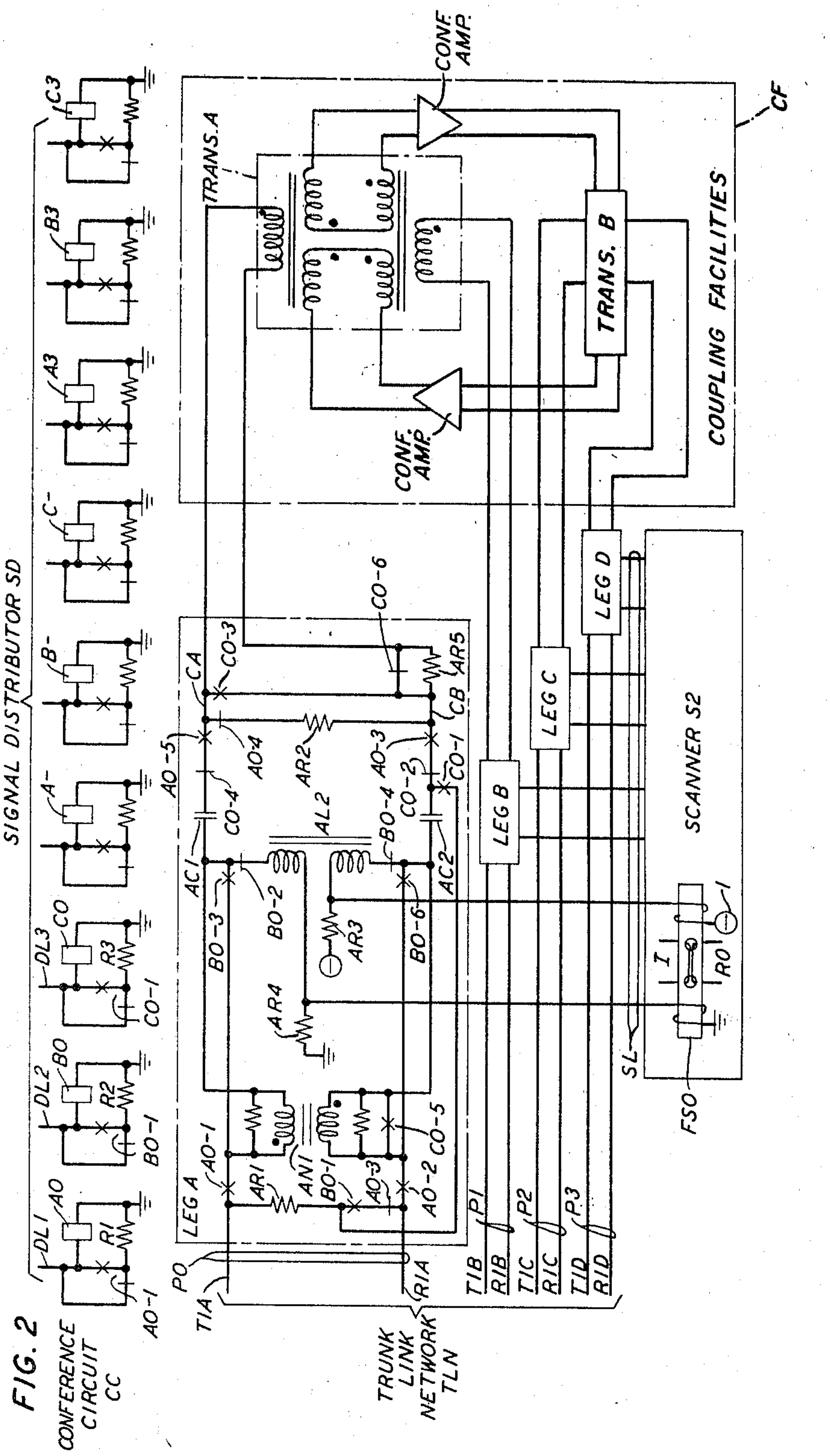
FIG. 2 shows schematically an illustrative conference circuit having exemplary splitting apparatus of our invention.

Turning now to FIG. 2, the conference circuit CC comprises four separate ports P0–P3 and each such port is terminated in the trunk link network TLN. The apparatus of each of the legs A–D associated with ports P0–P3 is electrically the same and from a control point of view is completely independent except for their coupling through the coupling facilities CF which comprise transformer networks TRANS. A and TRANS. B, as well as the conference amplifiers. The latter transformer networks and amplifiers may suitably be of the design disclosed in A. Feiner Patent 3,108,157, issued Oct. 22, 1963, to which reference may be made for a detailed understanding thereof. Accordingly, it is deemed advisable for the purpose of simplicity to describe the features of our invention with respect to one port P0 which is associated with leg A. Each of the ports P0–P3 is furnished with three magnetically latching relays, for example relays A0, B0 and C0, associated with leg A of port P0. The relays associated with ports P1 and P2 are represented by relays A—, B— and C— while the relays for port P3 are designated A3, B3 and C3. Each set of the three relays is operated and subsequently released under control of pulse signals of opposite polarities supplied by distributor SD to permit the associated port to be switched into eight different switching states for a conference call. All of these states are shown pictorially in FIG. 2A in accordance with principles set forth in an article entitled "The Map Method for Synthesis of Combinational Logic Circuits" by M. Karnaugh in the American Institute of Electrical Engineers Transactions, vol. 72, pp. 539–599 of November 1953.

Each of the operate circuits for relays A0, B0 and C0 includes a transfer (make and break) contact A0–1, B0–1 or C0–1 and a resistor R1, R2 or R3, which shunts the winding of the relay. One of these relays is operated, as set forth in Doblmaier et al., when distributor SD applies a momentary potential to the associated one of leads DL1–DL3 and thereby completes the path through the relay winding to ground. In operating, the relay actuates its associated transfer contact momentarily to open the break contact and then closing the make contact for establishing a momentary pulse current change over the associated lead to distributor SD whereby the distributor is notified that the proper relay has operated. The operation of the latter relay latches, or locks, its contacts operated until distributor SD subsequently applies a momentary pulse potential of opposite polarity to that of the operating potential.

The relays A0, B0 and C0 are initially released to place the conference port P0 in its IDLE state while it is not engaged in serving a call. During a call, these relays are selectively operated and released on a one-at-a-time basis to switch the port P0 into the next state utilized for serving a call. The ordered sequence in which the relays are operated and released is controlled by the program intelligence of processor CP and is slightly different for connections established to local customer stations and stations in distant offices via a trunk, such as trunk IT.

In the IDLE state of port P0, the termination resistor AR2 is connected via contacts A0–4 and C0–6 across the associated winding of transformer TRANS. A to reduce singing oscillations in the associated conference amplifiers.

When a trunk IT is connected via trunk circuit TC and network TLN to port P0, processor CP and distributor SD cooperate to switch that port from its IDLE to its CONT (continuity) state by operating relay B0, as explained. Upon operating, relay B0 connects resistor AR1 through contacts B0–1 and A0–3 across leads T1A and R1A for checking the continuity between port P0 and trunk circuit TC as disclosed in the cited B.S.T.J., pp. 2321–2353. After a successful check, processor CP and distributor SD switch port P0 from its CONT state to its TALK TRUNK state by operating relay A0 as described. The operation of relays A0 disconnects resistor AR1 from lead R1A at contact A0–3. Operated relay A0 also connects port P0 to the conference coupling facilities for enabling talking communication between the conference originator and each associated conferee. The latter connections are from leads T1A and R1A through contacts A0–1, A0–2, B0–3 and B0–6, capacitors AC1 and AC2, and contacts C0–4, C–02, A0–5, A0–3 and C0–6 to facilitate CF.

In the case where a local conferee station, such as station TS2, is connected via networks LLN and TLN to port P0, processor CP and distributor SD are operative for switching that port from its IDLE state to its TALK LOCAL state by operating relay A0, as already explained. In operating, relay A0 connects port P0 to the conference coupling facilities CF via leads T1A and R1A, contacts A0–1 and A0–2, loop compensation network AN1, capacitors AC1 and AC2, and contacts C0–4, C0–2, A0–5, A0–3 and C0–6 to a winding of TRANS. A whereby talking between the conference originator and each other conferee may take place. The operation of relay A0 also connects a ferrod sensor FS0 in scanner S2 to port P0 for supervising the associated conferee service. The latter connection extends from port P0 via contacts A0–1 and A0–2, network AN1, contacts B0–2 and B0–4, windings of inductor AL2, and energizing windings of ferrod FS0 to ground and negative potential 1, respectively.

Ferrod FS0 is one of a plurality of ferrods included in scanner S2 for monitoring "on-hook," "off-hook" switchhook flashes, digit signals and other supervisory data on station lines L1–LN, dial pulse receivers as well as ring ing and trunk circuits. Each such ferrod is connected to an individual strategic point of the functional circuit over certain of the scan leads SL. A ferrod comprises a rod, or stick, of ferromagnetic material which, in closed flux paths, exhibits remanent flux switching characteristics, but which is substantially nonremanent about its elongated, open flux path dimension. Around the stick is wound a pair of energizing windings. In addition, a ferrod comprises an interrogate winding I and a read-out winding R0, each of which is threaded through each of a pair of holes in the ferrod stick. The periphery of each such hole exhibits remanent flux switching characteristics. When a prescribed amount of current flows through the control windings of a ferrod, the ferromagnetic material is saturated and its incremental permeability approaches that of air. This saturated state is assumed by a ferrod when an "off-hook" condition is present on the associated telephone line. When less than the prescribed current flows through the energizing windings as for an "on-hook" condition, the permeability of the ferromagnetic material is relatively higher since it is not saturated. This low-high permeability characteristic of a ferrod is utilized for enabling the device to sense the "off-hook" and "on-hook" signals.

As disclosed in Doblmaier et al., interrogating pulses are periodically applied to the interrogate winding of each ferrod during a scanning operation under control of program instructions from processor CP. When the interrogated ferrod is not saturated by current through its energizing windings, each interrogate pulse is coupled by transformer action to the ferrod read-out winding R0 for indicating an "on-hook" signal. On the other hand, when the ferrod is saturated, the interrogate pulse is essentially not coupled to the read-out winding. Processor CP utilizes the read-out data for detecting service requests, switchhook flashes and dialed digits.

J. A. Baldwin, Jr., H. F. May Patent 3,175,042, dated Mar. 23, 1965 and the cited B.S.T.J., pp. 2257 et seq. may be consulted for supplemental disclosure of the structure and operation of ferrods.

In accordance with our invention, each of the ports P0–P3 is furnished with SPLIT I and SPLIT II states for the private consultation service during a conference call. SPLIT I state is also used during the add-on and disconnect operations of a conference call. Each such state provides an individual impedance termination to a conference controller line and to the coupling facilities CF for preventing undesired noise on the line and singing oscillations on the conference connections during prolonged "on-hook" signals which occur during a switchhook flash and a disconnect signal from the associated conferee station. Switchhook flashes and disconnect signals from a conference controller or local conferee line are sensed on port P0 by ferrod FS0 and are detected by processor CP during a scanning operation.

Port P0 is switched into its SPLIT I state when that port is associated with a local customer station, such as station TS1 whereas the SPLIT II state is used when port P0 is connected either to a ringing tone circuit RTC or to trunk IT via trunk circuit TC and network TLN. Processor CP and distributor SD cooperate to operate relay C0 for establishing the SPLIT I state of port P0. In operating, relay C0 connects leads T1A and R1A in series with resistor AR1, contact C0–1, capacitor AC2 and contact C0–5 which provides an impedance termination for the conference controller line. This termination is particularly useful for preventing noise on foreign exchange lines. Relay C0 also connects resistor AR5 across the associated TRANS. A winding via contacts C0–3 and C0–6 to prevent singing of the coupling facilities CF due to the open circuit termination toward the associated conferee station. The operation of relay C0 furthermore splits the connections between port P0 and facilities CF by opening contacts C0–2 and C0–4 to block conference communication for the conferee station associated with port P0.

It is advantageous to note that our invention provides a circuit configuration for providing an AR5 resistor termination to transformer TRANS. A while at the same time, insuring that no communication occurs between port P0 and facilities CF while relay C0 is operated. This configuration comprises the short circuiting of the conductors CA and CB via contacts C0–3 in addition to splitting the port-to-facilities connections at contacts C0–4 and C0–2. The result is to insure the blockage of communication in the event that contacts C0–4 or C0–2 should be bridged due to a trouble condition. Such a result is particularly important where a conferee station is positively to be excluded during a private consultation.

During the SPLIT I state, ferrod FS0 is connected to port P0 over the previously described path for supervising the associated conferee station. If the conferee should disconnect during this time, an "on-hook" signal is sensed by ferrod FS0 and subsequently detected by processor CP during a scanning operation. Processor CP then instructs distributor SD to switch port P0 from its SPLIT I through its transition state X1 to its IDLE state by successively releasing relay A0 and then relay C0.

The circuit configuration for the SPLIT II state of port

P1 is the same as the SPLIT I state except that relay B is operated at this time for disconnecting ferrod FS0 and the ground and negative potential 1 from port P0. A trunk termination comprising resistor AR1 and capacitor AC2 is connected to leads T1A and R1A via contacts C0–1 and B0–6.

To reclose a split port P0 after the consultation service has been completed, the conference controller flashes the telephone switchhook. Such a flash causes processor CP to effect the connection of a receiver CDPR to the controller station and the return of dial tone over the established connections to the controller station as previously explained. The controller then dials a code into the receiver CDPR which repeats it to scanner S2 and enables processor CP to detect the code during the scanning operations. This code causes processor CP to instruct distributor SD to switch port P0 from its SPLIT I or II state to the TALK LOCAL or TALK TRUNK state respectively by releasing relay C0. In releasing, relay C0 recloses contacts C0–2, C0–4, C0–5 and C0–6 and opens contacts C0–3 to reconnect port P0 over the previously described path to the associated winding of transformer TRANS. A whereby conference communication may be resumed. The processor CP also effects the release of receiver CDPR and changes the network connections of the controller station from receiver CDPR to a reserved idle conference port. Processor CP thereafter instructs distributor SD to switch the latter port to its appropriate talk state.

It is to be understood that the hereinbefore described arrangements are illustrative of the application of principles of our invention. In light of this teaching, it is apparent that numerous other arrangements may be devised by those skilled in the art without departing from the spirit and scope of the invention.

What is claimed is:

1. A communication system comprising a plurality of communication stations; a conference circuit having a plurality of ports, each connected individually to one of said stations, means connected to said ports for coupling said ports together for conference communication, means operable for automatically splitting the connection between said coupling means and any of said ports, and control means responsive to the receipt of instruction signals from one of said stations for operating said splitting means to split said connection between said coupling means and those of said ports associated with said instruction signals.

2. A communication system in accordance with claim 1, wherein said control means is subsequently responsive to other instruction signals from said one station for automatically releasing said operated splitting means to reclose the split connection whereby said associated ports are reconnected to said coupling means.

3. In combination, a plurality of communication stations, a conference circuit having a plurality of ports, each of said ports being connectable individually to any one of said stations, control means responsive to instruction signals from a first one of said stations for selectively connecting said first station to one of said ports and other ones of said stations individually to other ones of said ports, means connectable to said ports for coupling said ports together for conference communication, means in said circuit operable for splitting the connection between said coupling means and any of said ports, and means subsequently responsive to the receipt of other instruction signals for operating said splitting means to split said connection between said coupling means and one of said stations specified by said other instruction signals.

4. In combination, a plurality of communication stations, a conference circuit having a plurality of ports, each of said ports being connectable individually to any one of said stations, control means responsive to instruction signals from a first one of said stations for connecting said first station to one of said ports and other ones of said stations individually to other ones of said ports, means connectable to said ports for coupling said ports together for conference communication, apparatus in said circuit operable for connecting each of said ports to said coupling means, said control means being further responsive to said instruction signals for operating said apparatus to connect said ports to said coupling means, switch means subsequently operable for selectively opening the connections between any of said ports and said coupling means, and said control means being responsive to other instruction signals from said first station for operating said switch means to open the last-mentioned connections.

5. The combination in accordance with claim 4 wherein each of said ports comprises a pair of input conductors connectable to any one of said stations and a pair of output conductors connectable to said coupling means; wherein said apparatus comprises for each of said ports, capacitor means connectable between said input and output conductors of an associated port, and relay means having contacts and being operable to connect said capacitor means between said last-mentioned input and output conductors via said contacts; and wherein said switch means comprises for each of said ports, another relay means having switching contacts included in said last-mentioned connections between said input and output conductors of an associated port, and said other relay means being operable under control of said control means for opening said last-mentioned connections between said input and output conductors at said switching contacts.

6. The combination in accordance with claim 5 wherein said coupling means comprises amplifiers and transformer networks for coupling said amplifiers to the output conductors of each of said ports, further comprising a plurality of termination resistances for said coupling means, and wherein said other relay means of each of said ports comprises additional contacts for selectively bridging together the associated pair of output conductors and concurrently inserting one of said resistances in series with one of said associated port output conductors.

7. A conference circuit comprising a plurality of ports each being connectable individually to a conferee line; means for coupling said ports together for conference communication; each of said ports having an individual electrical network for establishing a circuit path between the port and said coupling means and comprising capacitor means connectable to said port and said coupling means, and switching means having a plurality of contacts, a switch device responsive to the receipt of a first control signal for controlling said contacts to connect said capacitor means to said port and to said coupling means, and apparatus subsequently responsive to another control signal for actuating said contacts to block conference communication over the connection between said capacitor means and said coupling means.

8. A conference circuit comprising a plurality of ports, each being connectable indvidually to a conferee line; means for coupling said ports together for conference communication; each of said ports having an individual electrical network for establishing a circuit path between the port and said coupling means and comprising a pair of input conductors connectable individually to a conferee line, a pair of output conductors connectable to said coupling means, and means for interconnecting said input and output conductors including a switch device having contact means and being responsive to the receipt of a control signal for bridging said pair of output conductors together and for blocking communication between said coupling means and the port.

9. A conference circuit comprising a plurality of ports, each being connectable individually to a conferee line; means for coupling each of said ports together for conference communication; each of said ports having an individual electrical network for establishing a circuit path between the port and said coupling means and comprising a pair of input conductors connectable individually to a conferee line, a pair of output conductors connectable to said coupling means, a first capacitor connectable between a first one of said input conductors and a first one of said output conductors, a second capacitor connectable between a second one of said input conductors and a second one of said output conductors, relay means having a plurality of contacts and being responsive to the receipt of control signals for actuating said contacts to connect said capacitors between said input and output conductors, and a relay device having contact means included in circuit with said relay means contacts between said input and output conductors, and said device being responsive to another control signal for actuating its contact means to split said connections between said capacitors and said output conductors.

10. A conference circuit in accordance with claim 9 wherein each of said electrical networks further comprises a termination resistance for furnishing a transmission termination to said coupling means, and additional contacts controlled by said relay device of the network for connecting said first and second output conductors of the network together while inserting said termination resistance in series with one of said output conductors in the connection to said coupling means, thereby to furnish a transmission termination for said coupling means.

11. A conference circuit in accordance with claim 10 wherein each of said electrical networks further comprises another termination resistance selectively connectable across said output conductors of the network, and means including other contacts of said relay means for selectively connecting said other termination resistance across said output conductors to provide an idle port termination for said coupling means.

12. A conference circuit in accordance with claim 9 wherein each of said electrical networks further comprises an input termination resistance for the input conductors of the network, additional contacts of said relay means for selectively connecting said input termination resistance to the last-mentioned input conductors, and other contacts of said relay device for selectively connecting said input termination resistance in series with one of said capacitors and said input conductors of the network.

13. A conference circuit in accordance with claim 12 wherein each of said electrical networks further comprises a conferee loop compensation transformer having a first and a second winding, wherein said relay means of each of said networks includes a first relay having magnetically latching contacts and being responsive to a first control signal for actuating said latching contacts to connect said first winding, said first one of said input conductors and said first capacitor of the network in series and to connect said second winding, said second one of said input conductors and said second capacitor of the network in series, and wherein each of said electrical networks has said input termination resistance connected to said first one of said input conductors, and contact means of said relay device for selectively bypassing said second winding for connecting said input termination resistance to said second one of said input conductors in series with said second capacitor and said first one of said input conductors.

14. Conference equipment comprising a conference circuit having a plurality of communication paths each being individually connectable to a conferee line, coupling means connectable to each of said paths for conference communication therebetween, a plurality of control termini, and apparatus associated with said control termini and being operable for selectively interconnecting each of said paths with said coupling means for conference communication; and control means for said circuit responsive to the receipt of instruction signals for applying electrical signals to said control termini for operating said apparatus to establish said interconnections, said control means being subsequently responsive to other instruction signals for applying additional electrical signals to said control termini for controlling said apparatus temporarily to split said established interconnection between any one of said paths and said coupling means for private communications over the other of said paths interconnected with said coupling means.

15. In a telephone system, telephone lines, a conference circuit having a plurality of ports and means for coupling said ports together for conference communication, link connector means operable for interconnecting said lines with individual ones of said ports, common control means responsive to the receipt of code signals from a calling one of said lines for operating said connector means for connecting said calling line and prescribed other ones of said lines to individual ones of said ports, said conference circuit including apparatus operable for connecting said coupling means to said individual ones of said ports, said control means being subsequently activated for operating said apparatus to connect said individual ones of said ports to said coupling means, and means thereafter responsive to the receipt of control signals from said calling line for further operating said apparatus to split the established connections between said coupling means and any of said individual ones of said ports.

16. A telephone system comprising telephone lines; link connector means operable for establishing communication connections from said lines; means for monitoring for a service request signal from any of said lines; digit receiver means; common control means including connector control means responsive to the receipt of a service request signal by said monitoring means from a first one of said lines for operating said connector means to establish connections from said first line to said receiver means, and means responsive to the receipt of digit code and control signals in said receiver means for storing said signals; and a conference circuit having a plurality of ports each being connectable through said connector means to an individual one of said lines, means connectable to said ports for coupling conference communication therebetween, and apparatus operable for connecting each of said ports to said coupling means; said common control means further including means responsive to the receipt of first digit code signals in said storing means from said first line for reserving said circuit for serving said first line, said connector control means being responsive to the receipt of second digit code signals in said storing means from said first line for operating said connector means to establish connections from said first line to a first one of said ports and from a second one of said lines to a second one of said ports, apparatus control means subsequently activated for operating said apparatus for connecting said first and second ports to said coupling means for conference communication between said first and second lines, means responsive to the recipt of a control signal from said first line for controlling said apparatus to disconnect said first port from said coupling means, said connector control means being thereafter activated for operating said connector means to establish connections from said first line to said receiver means, said connector control means being responsive to the receipt of a third digit code in said storing means from said first line for operating said connector means to establish connections from said first line to said first port and from a third one of said lines to a third one of said ports, said apparatus control means subsequently activated for operating said apparatus for connecting said first and third ports to said coupling means, means responsive to the receipt of another control signal from said first line for controlling said apparatus to disconnect said first port from said coupling means, said connector means being subsequently activated for operating said connector means to establish connections from said first line to said receiver means, said connector control means being further responsive to the receipt of a fourth digit code in said storing means for operating said connector to establish connections from said first line to said first port, said apparatus control means being controlled by said fourth digit code for operating said apparatus to split the connection between a predetermined one of said first, second and third ports and said coupling means, and means thereafter responsive to the receipt of an additional control signal in said storing means for reconnecting said predetermined one of said ports to said coupling means.

References Cited

UNITED STATES PATENTS

| | | | |
|---|---|---|---|
| 3,384,717 | 5/1968 | Coston. | |
| 2,975,237 | 3/1961 | Abbott | 179—1 |
| 3,108,157 | 10/1963 | Feiner | 179—1 |
| 3,231,678 | 1/1966 | Ward et al. | 179—18 |
| 3,320,367 | 5/1967 | Krom | 179—18 |

KATHLEEN H. CLAFFY, *Primary Examiner.*

ALBIN H. GESS, *Assistant Examiner.*